US011571990B2

(12) United States Patent
Kominato et al.

(10) Patent No.: US 11,571,990 B2
(45) Date of Patent: Feb. 7, 2023

(54) VEHICULAR DETECTOR AND VEHICULAR DETECTION SYSTEM

(71) Applicant: Yazaki Corporation, Tokyo (JP)

(72) Inventors: Yasuhiro Kominato, Shizuoka (JP); Goro Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 344 days.

(21) Appl. No.: 16/375,357

(22) Filed: Apr. 4, 2019

(65) Prior Publication Data

US 2019/0308524 A1 Oct. 10, 2019

(30) Foreign Application Priority Data

Apr. 9, 2018 (JP) .............................. JP2018-074591

(51) Int. Cl.
*B60N 2/00* (2006.01)
*B60R 21/015* (2006.01)
*B60R 22/48* (2006.01)
*H01Q 1/32* (2006.01)
*B60N 2/02* (2006.01)

(52) U.S. Cl.
CPC ........ *B60N 2/002* (2013.01); *B60R 21/01512* (2014.10); *B60R 21/01516* (2014.10); *B60R 22/48* (2013.01); *H01Q 1/32* (2013.01); *B60N 2002/0268* (2013.01); *B60R 2022/4808* (2013.01)

(58) Field of Classification Search
CPC ............ B60N 2/002; B60N 2002/0268; B60R 21/01512; B60R 21/01516; B60R 22/48; B60R 2022/4808; B60R 2022/4858; H01Q 1/32; G01D 5/12
See application file for complete search history.

(56) References Cited

U.S. PATENT DOCUMENTS

| 10,752,206 | B2 * | 8/2020 | Tinoco | ..................... B60R 22/48 |
| 2006/0139159 | A1 * | 6/2006 | Lee | ......................... G08B 21/24 340/457 |
| 2007/0056385 | A1 * | 3/2007 | Lorenz | ................. H01H 13/702 73/818 |

(Continued)

FOREIGN PATENT DOCUMENTS

| CN | 101022979 A | 8/2007 |
| EP | 1621411 A1 | 2/2006 |

(Continued)

*Primary Examiner* — James M McPherson
*Assistant Examiner* — Kyle J Kingsland
(74) *Attorney, Agent, or Firm* — Sughrue Mion, PLLC

(57) ABSTRACT

A detector includes a first flexible sheet, a second flexible sheet placed opposite to the first flexible sheet, and an insulation sheet intervening between them. The first flexible sheet includes a second antenna unit and first contact portions formed on a first opposing surface. The second flexible sheet includes a detection unit and second contact portions formed on a second opposing surface. The first contact portions and the second contact portions become a state of contact by an external force based on the seating of an occupant, cause the second antenna unit to output a transmission signal to the detection unit, and cause the detection unit to output a detection signal to the second antenna unit.

13 Claims, 6 Drawing Sheets

(56) References Cited

U.S. PATENT DOCUMENTS

| | | | |
|---|---|---|---|
| 2007/0139185 A1* | 6/2007 | Nathan | B60N 2/0244 |
| | | | 340/538 |
| 2008/0319616 A1 | 12/2008 | Federspiel et al. | |
| 2011/0074567 A1* | 3/2011 | Miyamori | B60N 2/002 |
| | | | 340/457.1 |
| 2013/0300555 A1* | 11/2013 | Sickon | B60R 22/48 |
| | | | 340/457.1 |
| 2018/0072255 A1* | 3/2018 | Foltin | B60R 21/01546 |

FOREIGN PATENT DOCUMENTS

| | | | |
|---|---|---|---|
| EP | 3109092 A1 * | 12/2016 | ....... B60R 21/01524 |
| JP | 2003-045274 A | 2/2003 | |
| JP | 2004-136811 A | 5/2004 | |
| JP | 2008-508133 A | 3/2008 | |
| JP | 2015-20447 A | 2/2015 | |
| JP | 2017-001421 A | 1/2017 | |

* cited by examiner

FIG.6
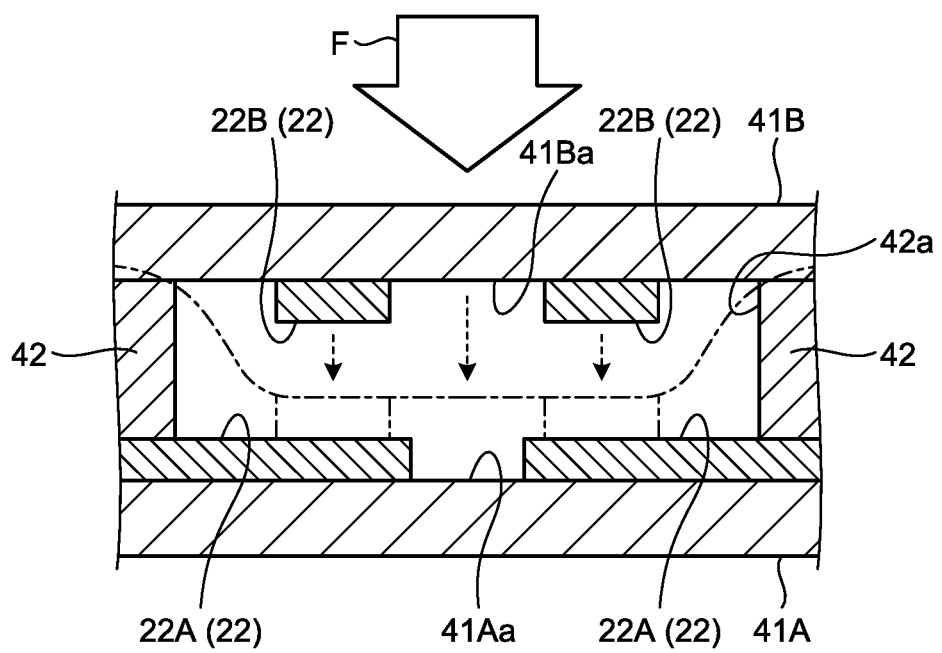
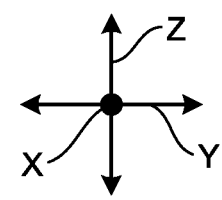

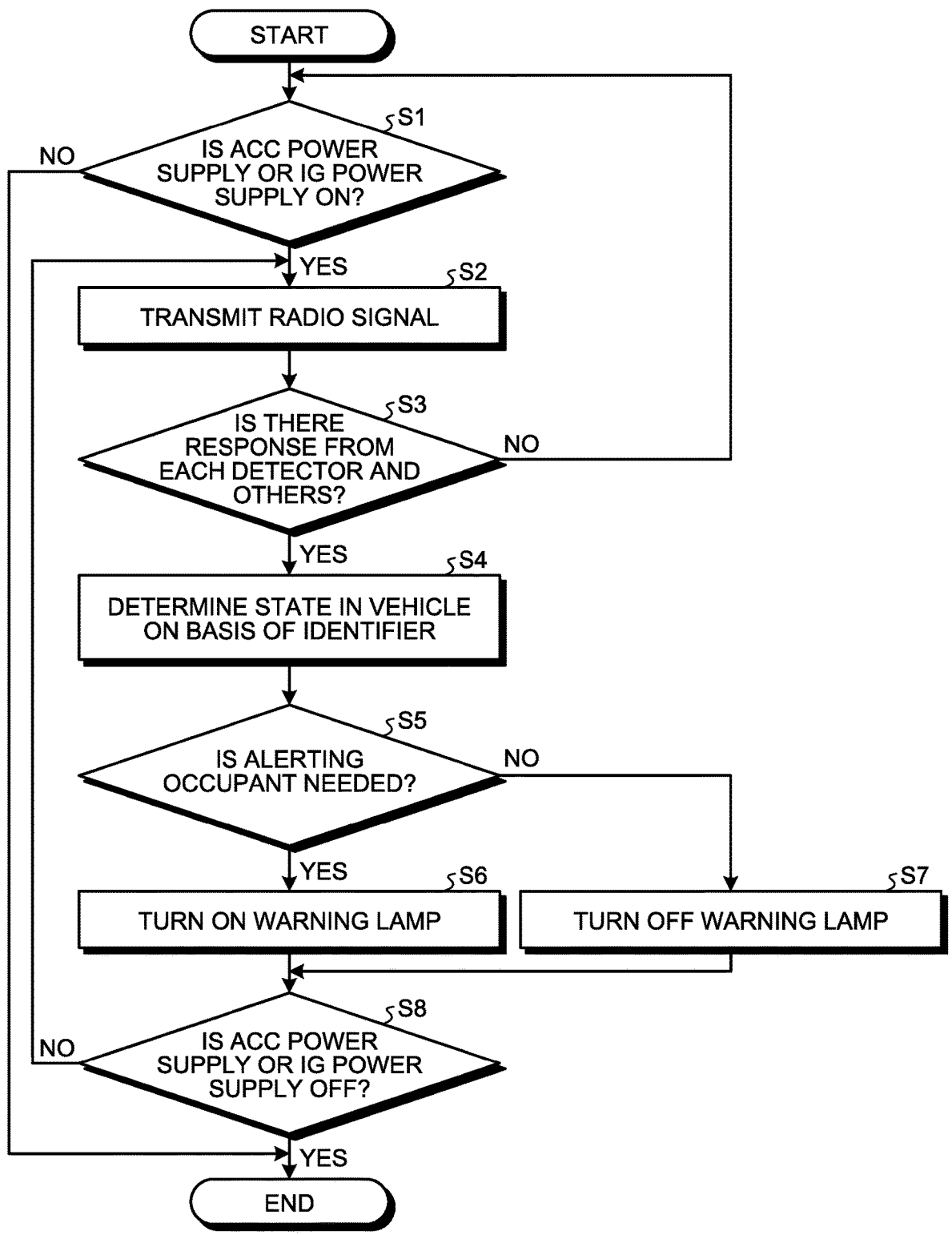

VEHICULAR DETECTOR AND VEHICULAR DETECTION SYSTEM

CROSS-REFERENCE TO RELATED APPLICATION(S)

The present application claims priority to and incorporates by reference the entire contents of Japanese Patent Application No. 2018-074591 filed in Japan on Apr. 9, 2018.

BACKGROUND OF THE INVENTION

1. Field of the Invention

The present invention relates to a vehicular detector and a vehicular detection system.

2. Description of the Related Art

Conventionally, there has been a vehicular detection system that is fitted to a vehicle and detects an internal state of the vehicle that changes in accordance with the action of occupants of the vehicle. There has been a vehicular detection system that includes a seat sensor configured to detect a seating state of an occupant on a seat and a buckle sensor configured to detect a fastening state of a seat belt that is provided to the seat, for example. Examples of the seat sensor include a seating detection device in which, in order to accurately determine the seating of the occupant, a plurality of detection areas are provided on a seat surface of a seat (for example, see Japanese Patent Application Laid-open No. 2017-001421). The examples of the seat sensor further include a seat sensor using, in order to detect an accurate load against a seat, a pair of flexible sheets and an insulation spacer (for example, see Japanese Patent Application Laid-open No. 2003-045274).

Incidentally, although a plurality of seat sensors are placed for each seat in order to accurately detect the seating of an occupant, because the shape of the seat surface of the seat is not uniform, the shape of the seat sensor needs to be changed in accordance with the placement position. Furthermore, because the conventional seat sensor is connected to a wire harness under the floor via a connector, a sub-harness that connects a plurality of seat sensors and the wire harness is needed, and that may lead to a cost increase and a weight increase.

SUMMARY OF THE INVENTION

The present invention has been made in view of the above-described problems, and an object of the present invention is to provide a vehicular detector and a vehicular detection system capable of achieving at least one of reducing a cost increase and a weight increase and accurately detecting the seating of an occupant.

A vehicular detector according to one aspect of the present invention is configured to transmit and receive a radio signal with a reader provided in a vehicle, detect seating of an occupant on a seat in the vehicle, and transmit a detection signal, and includes a first flexible sheet; a second flexible sheet placed opposite to the first flexible sheet; and an insulation sheet having electrical insulating property and intervening between the first flexible sheet and the second flexible sheet, wherein the first flexible sheet includes an antenna unit formed on a surface as a conductive pattern and configured to receive a transmission signal including a power supply radio signal from the reader, and a first contact portion electrically connected to the antenna unit and formed on a first opposing surface facing the second flexible sheet, the second flexible sheet includes a controller formed on a surface as a conductive pattern and configured to be driven by the transmission signal received by the antenna unit and output the detection signal, and a second contact portion electrically connected to the controller and formed on a second opposing surface facing the first flexible sheet, the insulation sheet has a through hole that, at a position where the first contact portion and the second contact portion face, runs through from the first opposing surface to the second opposing surface, and the first contact portion and the second contact portion become a state of making contact with each other by an external force based on seating of the occupant, cause the antenna unit to output the transmission signal to the controller, and cause the controller to output the detection signal to the antenna unit.

A vehicular detection system according to another aspect of the present invention includes the vehicular detector configured to detect seating of an occupant on a seat in a vehicle and transmit a first detection signal; a buckle sensor configured to detect a fastening state of a seat belt that is provided to the seat in the vehicle and transmit a second detection signal; and a reader provided in the vehicle and configured to receive the first detection signal and the second detection signal, wherein the reader includes a determining unit configured to determine a seating state of the occupant on the seat on a basis of the first detection signal, determine a fastening state of the seat belt on a basis of the second detection signal, and output a warning signal when the occupant is in a seating state and the seat belt is in an unfastened state, and an alert unit configured to warn the occupant in accordance with the warning signal.

According to still another aspect of the present invention, in the vehicular detection system, a plurality of the vehicular detectors may be placed on a seat surface portion of the seat with at least a part being spaced apart from each other, the vehicular detectors each may have different identification information and transmit the relevant identification information as the first detection signal to the reader, and the determining unit may determine a seating state of the occupant on a basis of at least number of pieces of the received identification information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a partial cross-sectional view illustrating one example of changes in the state of the vehicular detector in the embodiment; and FIG. 7 is a flowchart illustrating an operation example of the vehicular detection system in the embodiment.

DETAILED DESCRIPTION OF THE PREFERRED EMBODIMENT

A vehicular detector and a vehicular detection system according to the present invention will be described in detail with reference to the accompanying drawings. Note that the present invention is not intended to be limited by the following embodiment. The constituent elements in the following embodiment include elements easily achieved by a person skilled in the art or elements being substantially the same as the constituent elements. Furthermore, various omissions, substitutions, or modifications of the constituent elements in the following embodiment may be made without departing from the spirit of the present invention.

EMBODIMENT

Figure 2:
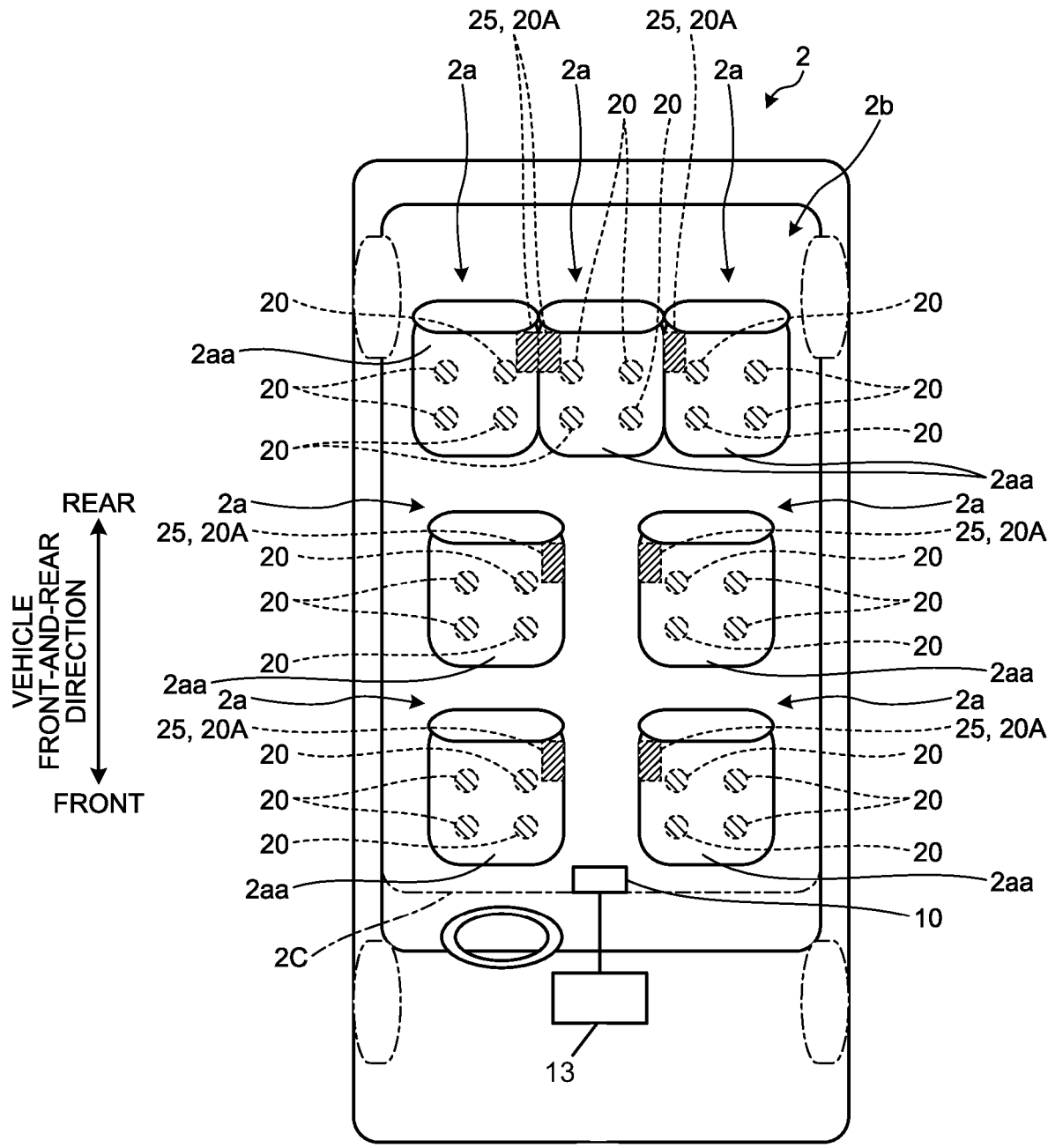
FIG. 2 is a schematic diagram illustrating an installation example of the vehicular detection system in the embodiment.

A vehicular detection system 1 is provided in a vehicle 2 such as an automobile. The vehicle 2, as illustrated in FIG. 2, includes a plurality of seats 2a that are arrayed, in a vehicle interior 2b, in three rows in a front-and-rear direction and in two or three rows in a left-and-right direction, for example. Each seat 2a is provided with a seat belt (not depicted), and a buckle 25 for fastening the seat belt. The vehicular detection system 1 determines seating states of occupants on the seats 2a in the vehicle interior 2b, and alerts the seated occupants when a certain condition is not satisfied. For example, when a seated occupant is not fastening a seat belt, the vehicular detection system 1 prompts such an occupant to fasten the seat belt. The vehicular detection system 1 of the present embodiment includes a reader 10, a plurality of detectors 20, and a plurality of buckle sensors 20A. The vehicular detection system 1 performs near field communication using a communication technology by radio frequency identifier (RFID) between the reader 10 and the detectors 20 and between the reader 10 and the buckle sensors 20A.

In the following description, as illustrated in FIG. 2, a vehicle front-and-rear direction of the vehicle 2 is equivalent to a whole length direction of the vehicle 2. In the vehicle front-and-rear direction, the side that the vehicle 2 moves forward may be referred to as front and the side that the vehicle 2 moves backward may be referred to as rear. A vehicle left-and-right direction is equivalent to a whole width direction of the vehicle 2. In the vehicle left-and-right direction, the left side by facing the front in the vehicle front-and-rear direction may be referred to as left side and the right side by facing the front in the vehicle front-and-rear direction may be referred to as right side. The vehicle front-and-rear direction and the vehicle left-and-right direction are orthogonal to each other, and in a state in which the vehicle 2 is positioned on a horizontal plane, the vehicle front-and-rear direction and the vehicle left-and-right direction lie along the horizontal direction. In FIG. 3 to FIG. 6, out of an X direction, a Y direction, and a Z direction orthogonal to one another, it is assumed that the X direction is "depth direction", the Y direction is "width direction", and the Z direction is "up-and-down direction". Note that the Z direction does not necessarily need to coincide with the vertical direction.

Figure 1:
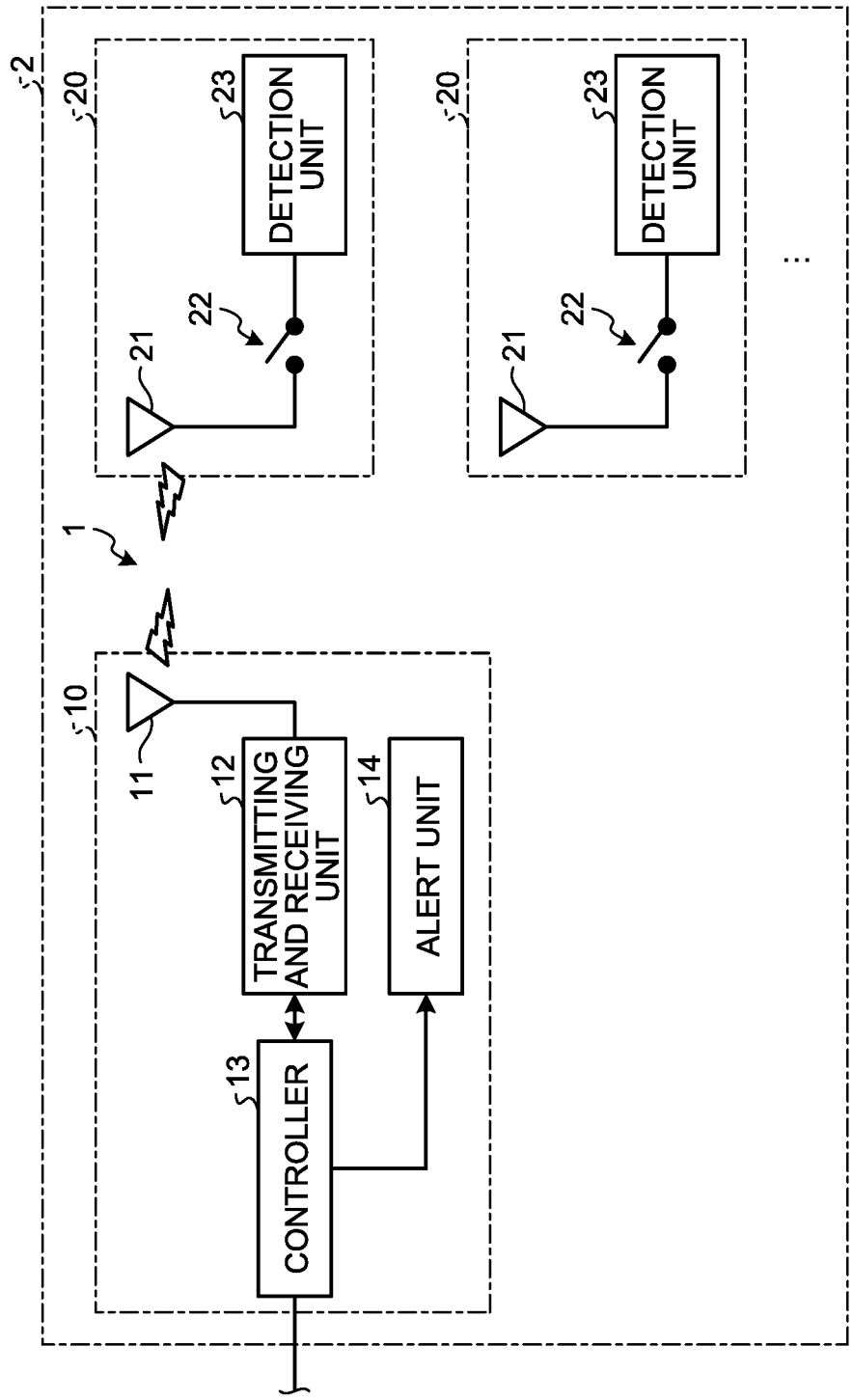
FIG. 1 is a block diagram illustrating a configuration example of a vehicular detection system according to an embodiment.

The reader 10 is provided in the vehicle 2. The reader 10 is, as illustrated in FIG. 2, placed at an end portion on the vehicle front side of an inner roof 2c of the vehicle interior 2b, for example. The placement position of the reader 10 is not limited to the end portion on the vehicle front side of the inner roof 2c, and the reader 10 may be placed in an instrument panel (not depicted) or at the center of the inner roof 2c. The reader 10 regularly emits radio waves in the vehicle interior 2b, and transmits and receives radio signals with the detectors 20 and the buckle sensor 20A that are placed on each seat 2a. The reader 10 supports passive RFID, supplies electric power to each detector 20 by transmitting radio waves (carrier wave), and receives reflection waves (subcarrier) with respect to the radio waves from the detectors 20, for example. The reader 10, as illustrated in FIG. 1, includes a first antenna unit 11, a transmitting and receiving unit 12, a controller 13, and an alert unit 14.

The first antenna unit 11 transmits and receives radio signals (radio waves) by a radio wave system using high frequencies such as UHF band and microwaves. The first antenna unit 11 is electrically connected to the transmitting and receiving unit 12, and transmits, to each detector 20 and each buckle sensor 20A, a power supply radio signal and a transmission signal including a carrier wave (hereinafter also referred to simply as "transmission signal") that are output from the transmitting and receiving unit 12. The transmission signal may include, in addition to the power supply radio signal, a control signal and the like directed to each detector 20 and each buckle sensor 20A. The first antenna unit 11 receives a detection signal transmitted from each detector 20 and each buckle sensor 20A and outputs the detection signal to the transmitting and receiving unit 12. The detection signal is a radio signal including identification information assigned to each detector 20 and each buckle sensor 20A. This identification information is referred to as what is called a tag ID and is a unique ID different for each detector 20.

The transmitting and receiving unit 12 is electrically connected to the first antenna unit 11 and transmits and receives radio signals via the first antenna unit 11. The transmitting and receiving unit 12 transmits the above-described transmission signal via the first antenna unit 11, for example. The transmitting and receiving unit 12 receives the detection signal transmitted from each detector 20 and each buckle sensor 20A via the first antenna unit 11. The transmitting and receiving unit 12 demodulates the received detection signal and outputs it to the controller 13.

The controller 13 is electrically connected to the transmitting and receiving unit 12 and the alert unit 14 and controls them. The controller 13 is made up including an electronic circuit mainly composed of a known microcomputer including a CPU, a ROM, a RAM, and an interface, for example. The controller 13 controls the transmitting and receiving unit 12 so as to transmit the transmission signal to each detector 20 at certain intervals (for example, 1 second intervals), for example. The controller 13 determines, as a determining unit, a seating state of each seat 2a in the vehicle interior 2b on the basis of the detection signal (first detection signal) that the transmitting and receiving unit 12 received from each detector 20. In the present embodiment, four detectors 20 are placed on a seat surface portion 2aa of each seat 2a, and the seating of an occupant is determined based on the number of the first detection signals obtained from the four detectors 20. The controller 13 identifies the position of the seat 2a on the basis of the identification information included in the received first detection signal, and determines the seating state of the occupant on the basis of the number of pieces of the identification information received from the four detectors 20 placed on the seat surface portion 2*aa* of the relevant seat 2*a*. For example, when four pieces of the identification information are received from the four detectors 20 placed on the seat surface portion 2*aa* of one seat 2*a*, the controller 13 determines that the occupant has been seated on the relevant seat 2*a*. Meanwhile, when less than or equal to three pieces of the identification information are received from the four detectors 20, the controller 13 determines that the occupant has not been seated on the seat 2*a* as baggage such as a bag has been placed on the seat surface portion 2*aa*. The controller 13 can determine a fastening state of a seat belt on each seat 2*a* on the basis of the detection signal (second detection signal) that the transmitting and receiving unit 12 received from each buckle sensor 20A. The controller 13 determines a seating state of the occupant on the seat 2*a* on the basis of the first detection signal, determines a fastening state of the seat belt on the basis of the second detection signal, and outputs a warning signal to the alert unit 14 when the occupant is in a seating state and the seat belt is in an unfastened state. The controller 13 is electrically connected to an electronic control unit (ECU) not depicted controlling a whole of the vehicle 2 and is capable of acquiring on/off information on an accessory (ACC) power supply or an ignition (IG) power supply from the ECU.

The alert unit 14 warns the occupant in accordance with a warning signal output from the controller 13. The alert unit 14 is warning lamps each emitting light having directivity as warning light and is made up of a plurality of light emitting diodes (LEDs) or the like, for example. The warning light is simple light that appeals at least to the visual sense of the occupant, and is red light, for example. The alert unit 14 is placed such that each optical axis is directed to an eye point EP of the occupant of each seat 2*a*.

Each detector 20 is a vehicular detector, is provided in the vehicle 2, transmits and receives radio signals with the reader 10, detects the seating of an occupant on the seat 2*a* in the vehicle interior 2*b*, and transmits the first detection signal. Each detector 20 includes no batteries, and is a device using passive RFID that is driven by the power supply radio signal transmitted from the reader 10 as the power. A plurality of detectors 20 are placed on the seat surface portion 2*aa* of each seat 2*a* with at least a part being spaced apart from each other. Each detector 20 of the present embodiment, as illustrated in FIG. 2, is placed so that two detectors 20 each are diagonally placed with respect to the seat surface portion 2*aa* of a rectangular shape formed by two sides of the vehicle front-and-rear direction and the vehicle left-and-right direction, for example. In each detector 20, it is preferable that the placement position and the number of placement be set so that the detection accuracy is not deteriorated by the difference in body shape and the like of the occupant. Each detector 20, as illustrated in FIG. 1, includes a second antenna unit 21, a switching circuit 22, and a detection unit 23.

The second antenna unit 21 is an antenna unit, and transmits and receives radio signals (radio waves) by a radio wave system using high frequencies such as UHF band and microwaves. The second antenna unit 21 is electrically connected to the switching circuit 22, and receives the transmission signal from the reader 10. The second antenna unit 21 outputs the received transmission signal to the detection unit 23 via the switching circuit 22 of an on-state. The second antenna unit 21 transmits, to the reader 10, the first detection signal that is output from the detection unit 23 via the switching circuit 22 of an on-state.

Figure 3:
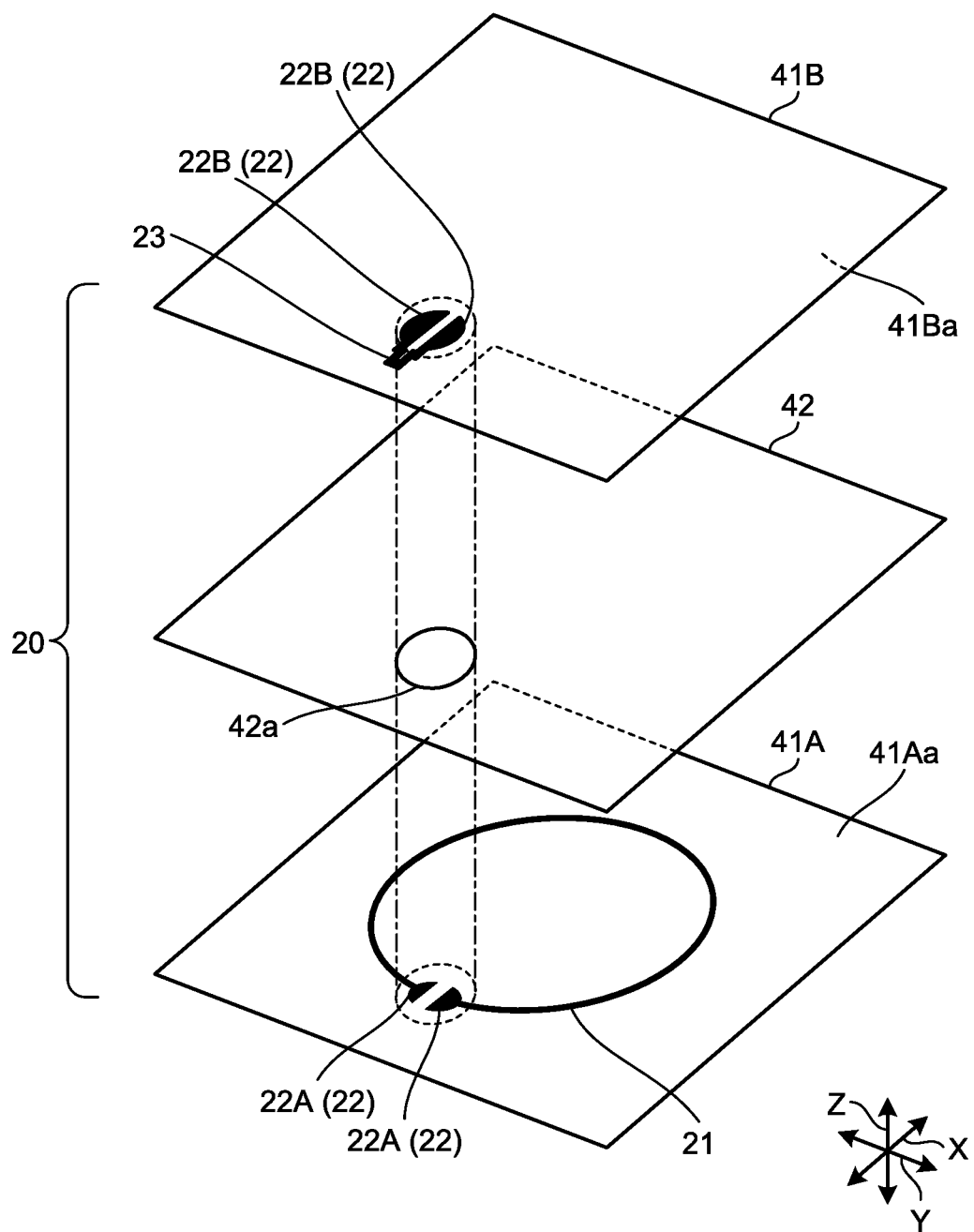
FIG. 3 is an exploded view illustrating a configuration example of a vehicular detector in the embodiment.

The switching circuit 22 is provided between the second antenna unit 21 and the detection unit 23, and switches an electrical contact point of the second antenna unit 21 and the detection unit 23 to a contact state or a non-contact state depending on the seating state of the occupant on the seat 2*a*. The switching circuit 22, as illustrated in FIG. 3, is made up of a pair of first contact portions 22A electrically connected to the second antenna unit 21 and a pair of second contact portions 22B electrically connected to the detection unit 23, for example. The switching circuit 22, depending on the seating state of the seat 2*a*, switches to a contact state where each of the first contact portions 22A and each of the second contact portions 22B are brought into contact or a non-contact state where the first contact portions 22A and the second contact portions 22B do not come in contact. In the switching circuit 22, when an external force F based on the seating of the occupant is being applied as illustrated in FIG. 6, the first contact portions 22A and the second contact portions 22B are in a contact state, that is, an electrically conductive state (on-state), for example. At this time, by detecting changes in resistance between the first contact portions 22A and the second contact portions 22B (or current flowing between the first contact portions 22A and the second contact portions 22B) with the detection unit 23, the on-state of the switching circuit 22 is detected. Meanwhile, in the switching circuit 22, when the external force F based on the seating of the occupant is not being applied, the first contact portions 22A and the second contact portions 22B are in a non-contact state, that is, an electrically non-conductive state (off-state). As just described, the switching circuit 22 switches to an on-state by the pressing force of an occupant onto the seat surface portion 2*aa* when the occupant is seated on the seat 2*a*, and switches to an off-state by being released from the pressing force of the occupant when the occupant is not seated on the seat 2*a*.

The detection unit 23 is a control unit and is a circuit that outputs the detection signal. The detection unit 23 is made up of an IC circuit and the like, for example. The detection unit 23 is driven by the power supply radio signal transmitted from the reader 10 as the power and outputs the detection signal. The detection unit 23 includes a rectifier circuit, a memory, and a signal output unit not depicted. The rectifier circuit rectifies the power supply radio signal received by the second antenna unit 21, and converts AC power into DC power. The memory stores therein the above-described identification information. The signal output unit outputs the detection signal based on the identification information stored in the memory to the second antenna unit 21. The detection unit 23 monitors the resistance of the switching circuit 22 (or the current flowing through the switching circuit 22) and determines the on-state/off-state of the switching circuit 22 depending on the changes in the resistance (or changes in the current). The detection unit 23 outputs the detection signal to the second antenna unit 21, when the switching circuit 22 is in an on-state.

The buckle sensor 20A is provided to the buckle 25. The buckle sensor 20A transmits and receives the radio signals with the reader 10, detects a fastening state of the seat belt, and transmits the second detection signal. The buckle sensor 20A includes no batteries, and is a device using passive RFID that is driven by the power supply radio signal transmitted from the reader 10 as the power.

Figure 4:
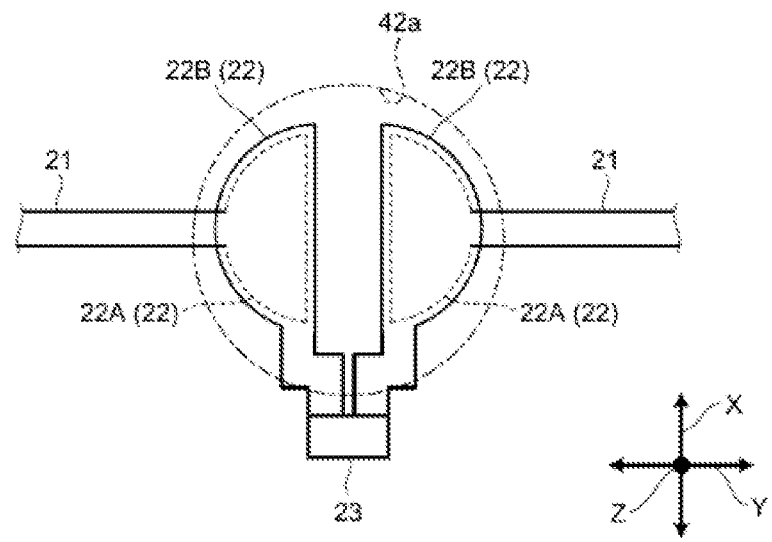
FIG. 4 is a partial enlarged view illustrating a configuration example of the vehicular detector in the embodiment.
Figure 5:
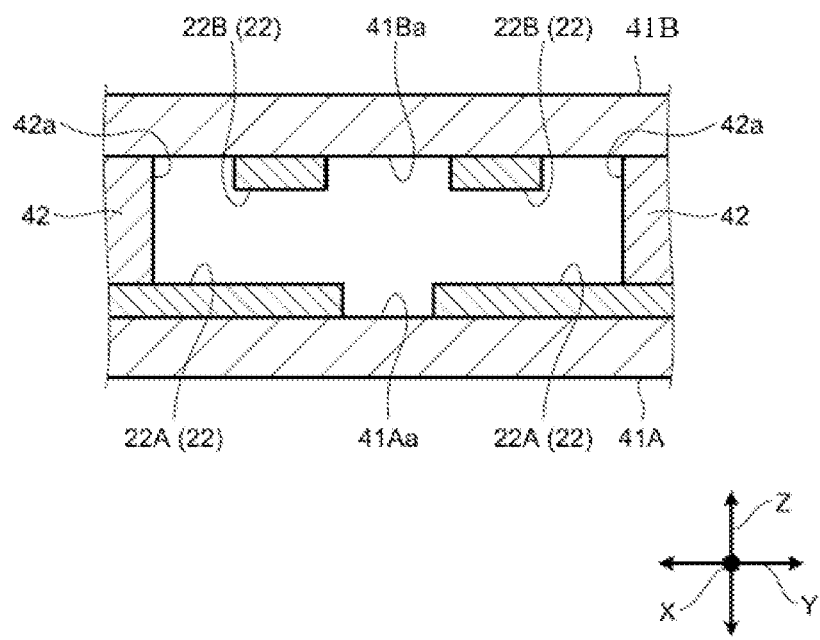
FIG. 5 is a partial cross-sectional view illustrating a configuration example of the vehicular detector in the embodiment.

Next, the structure of the detector 20 of the present embodiment will be described with reference to FIG. 3 to FIG. 5.

The detector 20, as illustrated in FIG. 3, includes a first flexible sheet 41A, a second flexible sheet 41B placed opposite to the first flexible sheet 41A, and an insulation sheet 42 intervening between the first flexible sheet 41A and the second flexible sheet 41B. The detector 20 has a structure in which, in the up-and-down direction (Z direction), the first flexible sheet 41A, the insulation sheet 42, and the second flexible sheet 41B are stacked in the foregoing order. The first flexible sheet and the second flexible sheet are film members having electrical insulating property and flexibility, and are composed of a resin material such as a polyester film, for example.

The first flexible sheet 41A includes the second antenna unit 21 and the pair of the first contact portions 22A. In the first flexible sheet 41A of the present embodiment, a conductive pattern including the second antenna unit 21 and the pair of the first contact portions 22A is formed on the surface. The conductive pattern is composed of a conductive material such as silver paste and is formed by screen printing or the like, for example. The second antenna unit 21 and each of the first contact portions 22A are, as illustrated in FIG. 5, formed on a first opposing surface 41Aa facing the second flexible sheet 41B. The second antenna unit 21 is formed, as the conductive pattern is wound round in an annular shape (loop shape). In the second antenna unit 21, each of the first contact portions 22A is formed at the starting-end portion on the winding start side and at the end portion on the winding end side. The second antenna unit 21 is preferably set at an optimal antenna length as an antenna, and is suitable to have an antenna length of 326 mm, for example. Each of the first contact portions 22A, as illustrated in FIG. 4, has a semi-circular shape for which the chord extends in the depth direction (X direction). The pair of the first contact portions 22A are placed with a certain insulating interval in the width direction (Y direction). In the pair of the first contact portions 22A, as illustrated in FIG. 5, it is preferable that the thickness in the up-and-down direction (Z direction) be the same and uniform in order to reduce poor contact and the like with the second contact portions 22B, for example.

The second flexible sheet 41B includes the detection unit 23 and the pair of the second contact portion 22B. The detection unit 23 and each of the second contact portions 22B are formed on a second opposing surface 41Ba facing the first flexible sheet 41A. The detection unit 23 is made up of an IC chip or the like, and is mounted on the second flexible sheet 41B. The second contact portions 22B are formed on the surface of the second flexible sheet 41B as a conductive pattern. The second contact portions 22B are formed in a size and a shape substantially the same as those of the first contact portions 22A.

The insulation sheet 42 is a film member having electrical insulating property and flexibility, and is composed of a resin material such as a polyester film, for example. The insulation sheet 42 has a through hole 42a that, at the position where the first contact portions 22A and the second contact portions 22B face, runs through from the first opposing surface 41Aa to the second opposing surface 41Ba. The through hole 42a is formed at the position where the first contact portions 22A are exposed in a state in which the first flexible sheet 41A and the insulation sheet 42 are stacked, and at the position where the second contact portions 22B are exposed in a state in which the second flexible sheet 41B and the insulation sheet 42 are stacked. The through hole 42a, as illustrated in FIG. 4, has a pore diameter capable of accommodating the switching circuit 22 including the pair of the first contact portions 22A and the pair of the second contact portions 22B. In the insulation sheet 42, it is preferable that the thickness in the up-and-down direction be set such that the first contact portions 22A and the second contact portions 22B come in contact in response to the external force F based on the seating of the occupant, for example.

Next, an operation example of the vehicular detection system 1 will be described with reference to FIG. 7.

The controller 13 of the vehicular detection system 1 first determines whether the ACC power supply or the IG power supply is on (Step S1). Then, when the ACC power supply or the IG power supply is on (Yes at Step S1), the controller 13 detects by the transmitting and receiving unit 12 each detector 20 and each buckle sensor 20A (Step S2). For example, the controller 13 transmits the transmission signal including the power supply radio signal to each detector 20 and each buckle sensor 20A from the transmitting and receiving unit 12 via the first antenna unit 11 at certain intervals (for example, 1 second intervals).

Then, the controller 13 determines whether there is a response from each detector 20 and each buckle sensor 20A (Step S3). For example, when the switching circuit 22 is in an on-state, each detector 20 electrically connects between the detection unit 23 and the second antenna unit 21, and transmits the first detection signal to the reader 10 from the detection unit 23 via the second antenna unit 21. Meanwhile, when the switching circuit 22 is in an off-state, each detector 20 interrupts the connection between the detection unit 23 and the second antenna unit 21, and does not transmit the first detection signal to the reader 10 from the detection unit 23 via the second antenna unit 21. When the detection signal (including the first detection signal and the second detection signal) from each detector 20 and each buckle sensor 20A is received, the reader 10 outputs the identification information on the received detection signal to the controller 13. The controller 13 determines that, when the identification information is output from the reader 10, there has been a response from each detector 20 and each buckle sensor 20A. When determined that there has been a response from each detector 20 and each buckle sensor 20A (Yes at Step S3), the controller 13 determines, based on the identification information, a seating state of the seat 2a and a fastening state of the seat belt (Step S4). For example, as in the foregoing, when four pieces of the identification information are received from the four detectors 20 placed on the seat surface portion 2aa of one seat 2a, the controller 13 determines that the occupant has been seated on the relevant seat 2a. Meanwhile, when less than or equal to three pieces of the identification information are received from the four detectors 20, the controller 13 determines that the occupant has not been seated on the seat 2a.

Then, the controller 13 determines whether alerting the occupant is needed depending on the fastening state of the seat belt of the seat 2a on which the relevant occupant is seated (Step S5). For example, the controller 13 determines that alerting is needed when the seat belt of the seat 2a on which the occupant is seated is not fastened (Yes at Step S5), and outputs a warning signal to the alert unit 14. The alert unit 14 turns on the warning lamp in accordance with the output warning signal, and warns the occupant not fastening the seat belt (Step S6). Meanwhile, the controller 13 determines that alerting is not needed when the seat belt of the seat 2a on which the occupant is seated has been fastened (No at Step S5), and outputs a turn-off signal to the alert unit 14. The alert unit 14 turns off the warning lamp in accordance with the output turn-off signal (Step S7). Subsequently, the controller 13 determines whether the ACC power supply or the IG power supply is off (Step S8). When the ACC power supply or the IG power supply is off (Yes at Step S8), the controller 13 ends the present processing. Meanwhile, when the ACC power supply or the IG power supply is on (No at Step S8), the controller 13 performs the above-described processing at Step S2 and subsequent steps.

At the above-described Step S1, when the ACC power supply or the IG power supply is off (No at Step S1), the controller 13 ends the present processing. At the above-described Step S3, when there is no response from each detector 20 (No at Step S3), the controller 13 performs the above-described processing at Step S1 and subsequent steps.

As in the foregoing, the detector 20 of the present embodiment includes the first flexible sheet 41A, the second flexible sheet 41B placed opposite to the first flexible sheet 41A, and the insulation sheet 42 having electrical insulating property and intervening between the first flexible sheet 41A and the second flexible sheet 41B. The first flexible sheet 41A includes the second antenna unit 21 that is formed on the surface as a conductive pattern and configured to receive a transmission signal including a power supply radio signal from the reader 10, and the first contact portions 22A that are electrically connected to the second antenna unit 21 and formed on the first opposing surface 41Aa facing the second flexible sheet 41B. The second flexible sheet 41B includes the detection unit 23 that is formed on the surface as a conductive pattern and configured to be driven by the transmission signal received by the second antenna unit 21 and output a detection signal, and the second contact portions 22B that are electrically connected to the detection unit 23 and formed on the second opposing surface 41Ba facing the first flexible sheet 41A. The insulation sheet 42 has the through hole 42a that, at the position where the first contact portions 22A and the second contact portions 22B face, runs through from the first opposing surface 41Aa to the second opposing surface 41Ba. The first contact portions 22A and the second contact portions 22B are configured to be in a state of making contact with each other by the external force F based on the seating of an occupant, cause the second antenna unit 21 to output the transmission signal to the detection unit 23, and cause the detection unit 23 to output the detection signal to the second antenna unit 21. As just described, because the detector 20 is driven by the power supply radio signal received from the reader 10 as the power, it is possible to make a battery, and wiring for power supply unnecessary and to reduce an increase in manufacturing cost and an increase in weight. Because the detector 20 is made up of flexible sheets, it is possible to be tailored to the shapes of the different seats 2a, and it is also possible to improve the installation ease of the detector 20 and to accurately detect the seating of the occupant.

The vehicular detection system 1 of the present embodiment includes the detectors 20, the buckle sensors 20A, and the reader 10. The reader 10 determines a seating state of an occupant on the seat 2a on the basis of the first detection signal, determines a fastening state of a seat belt on the basis of the second detection signal, and warns the relevant occupant when the occupant is in a seating state and the seat belt is in an unfastened state. Accordingly, when the occupant seated on the seat 2a is in an unfastened state of the seat belt, it is possible to prompt the occupant to fasten the seat belt.

Furthermore, in the vehicular detection system 1 of the present embodiment, a plurality of detectors 20 are placed on the seat surface portion 2aa of the seat 2a with at least a part being spaced apart from each other. The detectors 20 each have different identification information and transmit the relevant identification information as the first detection signal to the reader 10. The reader 10 determines the seating state of the occupant on the basis of the number of pieces of the received identification information. Accordingly, it is possible to accurately detect the seating of the occupant.

In the above-described embodiment, the radio communication by RFID is performed between the reader 10 and each detector 20 and between the reader 10 and each buckle sensor 20A. However, the embodiment is not limited thereto as long as it is a technology of performing near field communication, and near field communication (NFC), TransferJet (registered trademark), ZigBee (registered trademark), or the like may be used.

In the above-described embodiment, the controller 13 and the ECU are separately configured. However, the controller 13 and the ECU may be integrally configured. That is, the ECU may be configured to execute the operation that the controller 13 executes.

In the above-described embodiment, the detector 20 and the buckle sensor 20A have been separately described. However, the detector 20 and the buckle sensor 20A may be the same, or the detector 20 in place of the buckle sensor 20A may be placed in the buckle 25.

With the vehicular detector and the vehicular detection system according to the present embodiments, the present embodiments have an effect in that at least one of reducing a cost increase and a weight increase and accurately detecting the seating of an occupant can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular detector configured to transmit and receive a radio signal with a reader provided in a vehicle, detect seating of an occupant on a seat in the vehicle, and transmit a detection signal, the vehicular detector comprising:
    a first flexible sheet;
    a second flexible sheet placed opposite to the first flexible sheet; and
    an insulation sheet having electrical insulating property and intervening between the first flexible sheet and the second flexible sheet, wherein
    the first flexible sheet comprises:
        an antenna unit formed on a surface as a first conductive pattern and configured to receive a transmission signal including a power supply radio signal from the reader, and
        a pair of first contact portions electrically connected to the antenna unit and formed on a first opposing surface facing the second flexible sheet,
    the second flexible sheet comprises:
        a first controller formed on a surface as a second conductive pattern and configured to be driven by the transmission signal received by the antenna unit and output the detection signal, and
        a pair of second contact portions electrically connected to the first controller and formed on a second opposing surface facing the first flexible sheet,
    wherein the insulation sheet has a through hole that, at a position where the pair of first contact portions and the pair of second contact portions face, runs through from the first opposing surface to the second opposing surface,
    wherein the pair of first contact portions and the pair of second contact portions become a state of making contact with each other by an external force based on seating of the occupant, the state causing the antenna unit to output the transmission signal to the first controller, and the transmission signal output to the first controller causes the first controller to output the detection signal to the antenna unit, wherein both the pair of first contact portions and the pair of second contact portions face each other in the same through hole, wherein the pair of first contact portions and the pair of second contact portions configured to make direct contact with each other in the same through hole, wherein the second flexible sheet comprises a detector circuit, which includes the first controller, wherein the detector circuit is electrically provided between the pair of second contact portions, and wherein detection signal is output when both the pair of second contact portions and the pair of first contact portions contact each other.

2. A vehicular detection system comprising:
at least one vehicular detector configured to detect seating of an occupant on a seat in a vehicle and transmit a first detection signal;
a buckle sensor configured to detect a fastening state of a seat belt that is provided to the seat in the vehicle and transmit a second detection signal; and
a reader provided in the vehicle and configured to receive the first detection signal and the second detection signal, wherein
the reader comprises:
  a second controller configured to determine a seating state of the occupant on the seat on a basis of the first detection signal, determine a fastening state of the seat belt on a basis of the second detection signal, and output a warning signal when the occupant is in a seating state and the seat belt is in an unfastened state, and
  an alert light configured to warn the occupant in accordance with the warning signal, and
the at least one vehicular detector comprises:
  a first flexible sheet;
  a second flexible sheet placed opposite to the first flexible sheet; and
  an insulation sheet having electrical insulating property and intervening between the first flexible sheet and the second flexible sheet, wherein
  the first flexible sheet comprises:
    an antenna unit formed on a surface as a first conductive pattern and configured to receive a transmission signal including a power supply radio signal from the reader, and
    a pair of first contact portions electrically connected to the antenna unit and formed on a first opposing surface facing the second flexible sheet,
  the second flexible sheet comprises:
    a first controller formed on a surface as a second conductive pattern and configured to be driven by the transmission signal received by the antenna unit and output the detection signal, and
    a pair of second contact portions electrically connected to the first controller and formed on a second opposing surface facing the first flexible sheet,
wherein the insulation sheet has a through hole that, at a position where the pair of first contact portions and the pair of second contact portions face, runs through from the first opposing surface to the second opposing surface, wherein the pair of first contact portions and the pair of second contact portions become a state of making contact with each other by an external force based on seating of the occupant, the state causing the antenna unit to output the transmission signal to the first controller, and the transmission signal output to the first controller causes the first controller to output the detection signal to the antenna unit, wherein both the pair of first contact portions and the pair of second contact portions face each other in the same through hole, wherein the pair of first contact portions and the pair of second contact portions configured to make direct contact with each other in the same through hole, wherein the second flexible sheet comprises a detector circuit, which includes the first controller, wherein the detector circuit is electrically provided between the pair of second contact portions, and wherein detection signal is output when both the pair of second contact portions and the pair of first contact portions contact each other.

3. The vehicular detection system according to claim 2, wherein
the at least one vehicular detector comprises a plurality of the vehicular detectors placed on a seat surface portion of the seat, the plurality of vehicular detectors being separated from each other,
each of the vehicular detectors are connected to a different antenna unit,
each of the vehicular detectors have different identification information and transmit the relevant identification information as the first detection signal to the reader through the respective antenna unit, and
the second controller determines a seating state of the occupant based on at least number of pieces of the received identification information.

4. The vehicular detector of claim 1, wherein the pair of first contact portions comprises a first first contact portion and a second first contact portion,
wherein the pair of second contact portions comprises a first second contact portion and a second second contact portion, and
wherein the first first contact portion faces the first second contact portion in the through hole of the insulating film, and the second first contact portion faces the second second contact portion in the same through hole of the insulating film.

5. The vehicular detector of claim 4, wherein the first first contact portion is spaced apart from the second first contact portion.

6. The vehicular detector of claim 4, wherein the first second contact portion and the second second contact portion spaced apart from the second first contact portion.

7. The vehicular detection system of claim 2, wherein the pair of first contact portions comprises a first first contact portion and a second first contact portion,
wherein the pair of second contact portions comprises a first second contact portion and a second second contact portion, and
wherein the first first contact portion faces the first second contact portion in the through hole of the insulating film, and the second first contact portion faces the second second contact portion in the same through hole of the insulating film.

8. The vehicular detection system of claim 7, wherein the first first contact portion is spaced apart from the second first contact portion.

9. The vehicular detection system of claim 7, wherein the first second contact portion and the second second contact portion spaced apart from the second first contact portion.

10. The vehicular detector of claim 1, wherein the detector circuit is configured to detect a change in resistance between the pair of second contact portions.

11. The vehicular detector of claim 1, wherein the detector circuit is configured to detect a change in current flowing between the pair of second contact portions.

12. The vehicular detection system of claim 2, wherein the detector circuit is configured to detect a change in resistance between the pair of second contact portions.

13. The vehicular detection system of claim 2, wherein the detector circuit is configured to detect a change in current flowing between the pair of second contact portions.

\* \* \* \* \*